US009942115B2

(12) United States Patent
Rizzi et al.

(10) Patent No.: US 9,942,115 B2
(45) Date of Patent: Apr. 10, 2018

(54) TECHNIQUES FOR PROVIDING VISUALIZATION AND ANALYSIS OF PERFORMANCE DATA

(71) Applicant: Viavi Solutions Inc., Milpitas, CA (US)

(72) Inventors: Edoardo Rizzi, Longmont, CO (US); Steven Dodge, Plano, TX (US); Sameh Yamany, Longmont, CO (US)

(73) Assignee: VIAVI Solutions Inc., San Jose, CA (US)

( * ) Notice: Subject to any disclaimer, the term of this patent is extended or adjusted under 35 U.S.C. 154(b) by 125 days.

(21) Appl. No.: 14/498,242

(22) Filed: Sep. 26, 2014

(65) Prior Publication Data

US 2015/0089054 A1    Mar. 26, 2015

Related U.S. Application Data

(60) Provisional application No. 61/883,015, filed on Sep. 26, 2013.

(51) Int. Cl.
*G06F 15/173* (2006.01)
*H04L 12/26* (2006.01)
*H04L 12/24* (2006.01)

(52) U.S. Cl.
CPC ............ *H04L 43/045* (2013.01); *H04L 41/22* (2013.01)

(58) Field of Classification Search
None
See application file for complete search history.

(56) References Cited

U.S. PATENT DOCUMENTS

| 7,039,015 B1 | 5/2006 | Vallone et al. |
| 8,032,621 B1 | 10/2011 | Upalekar et al. |
| 2003/0126613 A1* | 7/2003 | McGuire ............... G06F 11/321 725/109 |

(Continued)

OTHER PUBLICATIONS

European Search Report corresponding to EP 14 18 6716, dated Mar. 26, 2015, 8 pages.

*Primary Examiner* — Phyllis A Book
(74) *Attorney, Agent, or Firm* — Harrity & Harrity, LLP

(57) ABSTRACT

Techniques for providing visualization and analysis of performance data are disclosed. In one particular exemplary embodiment, the techniques may be realized as a system for providing visualization and analysis of performance data. The system may comprise one or more processors communicatively coupled to a mobile communications network. The one or more processors may be configured to monitor data traffic within the mobile communications network. The one or more processors may further be configured to collect network performance data associated with the mobile communications network. The one or more processors may also be configured to provide user-selectable options to a user at a mobile device for viewing the network performance data. The one or more processors may further be configured to process the network performance data based on the user-selectable options identified by the user. The one or more processors may also be configured to provide a visualization to be displayed at the mobile device based on the processed network performance data, where the visualization presents the processed network performance data that improves customer experience assurance.

20 Claims, 12 Drawing Sheets

(56) References Cited

U.S. PATENT DOCUMENTS

| | | | | |
|---|---|---|---|---|
| 2006/0074809 A1* | 4/2006 | Meyer | .................... | G06Q 10/06 |
| | | | | 705/52 |
| 2007/0206507 A1* | 9/2007 | Reichman | ........... | H04L 41/5009 |
| | | | | 370/252 |
| 2008/0184130 A1* | 7/2008 | Tien | ....................... | G06Q 10/06 |
| | | | | 715/745 |
| 2009/0106366 A1* | 4/2009 | Virtanen | ............... | H04L 12/589 |
| | | | | 709/206 |
| 2011/0258573 A1* | 10/2011 | Wetzer | ...................... | G06F 9/54 |
| | | | | 715/775 |
| 2012/0102431 A1* | 4/2012 | Krolczyk | .......... | G06F 17/30044 |
| | | | | 715/790 |
| 2013/0090966 A1* | 4/2013 | Rivere | ............. | G06Q 10/06311 |
| | | | | 705/7.15 |
| 2013/0163438 A1* | 6/2013 | Wilkinson | .............. | H04L 43/50 |
| | | | | 370/242 |
| 2014/0033242 A1* | 1/2014 | Rao | ...................... | H04N 21/442 |
| | | | | 725/14 |
| 2014/0055490 A1* | 2/2014 | Mule | ....................... | G06T 11/80 |
| | | | | 345/633 |

* cited by examiner

TECHNIQUES FOR PROVIDING VISUALIZATION AND ANALYSIS OF PERFORMANCE DATA

CROSS-REFERENCE TO RELATED APPLICATIONS

This application claims the benefit of U.S. Provisional Application No. 61/883,015, entitled "Methods, Systems, and Computer Products for Visualization and Analysis of Performance Data," filed Sep. 26, 2013, which is herein incorporated by reference in its entirety.

FIELD OF DISCLOSURE

The present disclosure relates to communication networks and service assurance, and, more particularly, to techniques for providing visualization and analysis of performance data.

BACKGROUND

In order to support the growing number of mobile communications devices, service assurance or customer experience assurance (CEA) is become increasingly important for Communications Service Providers (CSPs) to ensure that services offered over networks meet a pre-defined service quality level for an optimal subscriber experience. CEA enables CSPs to identify faults in the network and resolve these issues in a timely manner so as to minimize service downtime. In addition, CEA may include implementing policies and processes to proactively pinpoint, diagnose and resolve service quality degradations or device malfunctions before subscribers are impacted.

Conventional solutions are challenged to provide real time and scalable solutions that meet the demands of current network volume and traffic analysis. Some conventional processes involve installing expensive large, and complex hardware probes at aggregate network nodes to be able to better detect service and traffic degradations. Furthermore some conventional monitoring techniques may sample data packets as they arrive, typically based on random sampling techniques, so only a fraction of the packets may be examined. While helpful, such approaches are limited and may not allow accurate detection and characterization of a network and its service performance and usage. In addition, also some conventional systems simply cannot scale for current volume of traffic and therefore are inadequate to identify any key trends and issues or provide visibility for efficient analysis of performance data.

In view of the foregoing, it may be understood that there may be significant problems and shortcomings associated with current solutions and technologies for monitoring communication networks and service assurance, and, more particularly, to techniques for providing visualization and analysis of performance data.

BRIEF DESCRIPTION OF DRAWINGS

In order to facilitate a fuller understanding of the exemplary embodiments, reference is now made to the appended drawings, in which like elements are referenced with like numerals. These drawings should not be construed as limiting the present disclosure, but are intended to be illustrative only.

FIGS. 3A-3I depict illustrative screenshots for providing visualization and analysis of performance data, according to an exemplary embodiments.

DETAILED DESCRIPTION OF EMBODIMENTS

Figure 1:
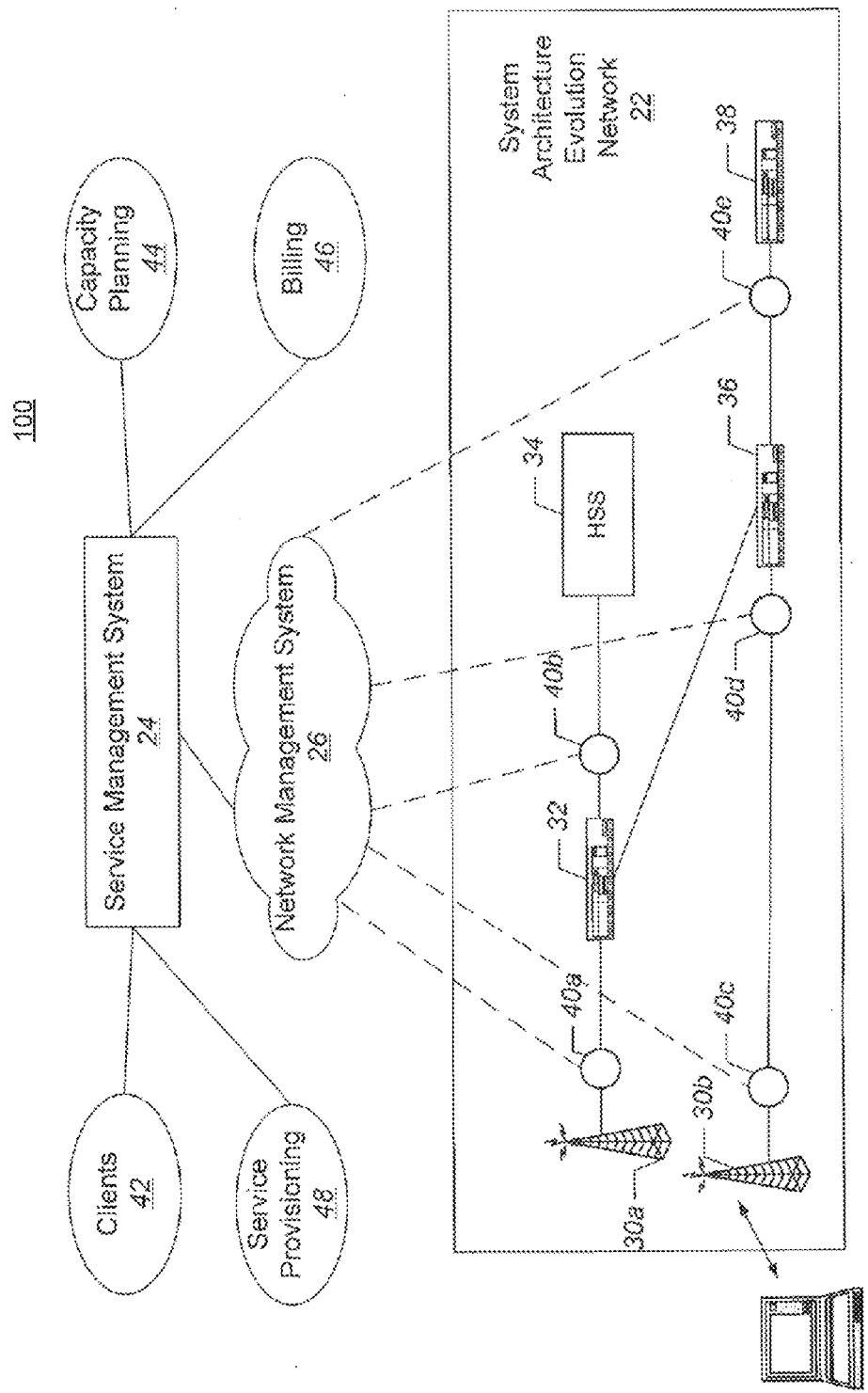
FIG. 1 depicts a system architecture for providing visualization and analysis of performance data, according to an exemplary embodiment.

Reference will now be made in detail to exemplary embodiments, examples of which are illustrated in the accompanying drawings. It should be appreciated that the same reference numbers are used throughout the drawings to refer to the same or like parts. It should be appreciated that the following detailed descriptions are exemplary and explanatory and are not restrictive.

While susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure as defined by the claims. Like reference numbers signify like elements throughout the description of the figures.

As used herein, singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Exemplary embodiments may provide a system and method for providing visualization and analysis of performance data. That is, exemplary embodiments may, among other things, improve CEA by providing visualization and analysis of performance data. Embodiments described herein may break away from conventional systems and methods for monitoring by changing how network analytics are generated and CEA is done. In larger-volume networks, multiple technologies may coexist, and there may be jurisdictions very high (e.g., 90-100%) user penetration. Such high levels of user traffic may be difficult to analyze via on a single call-by-call basis.

As described above, conventional test and measurements solution vendors are faced with a great challenge to provide real time and scalable solutions for communication service and traffic analysis. For example, efficient management and monitoring is becoming more difficult in this environment because control-plane traffic volume has grown exponentially with the advent of 4G/LTE, this means that user-plane traffic may also need to be analyzed. Conventional monitoring techniques may not scale because they seek to: (1) capture every traffic packet of interest; (2) correlate all packets to individual flows upfront and build a data record for every flow; and (3) use external data representations (XDRs) to calculate per-flow KPIs and correlated messages for transaction tracing. Because these workflows generate numerous KPIs, it may be difficult to identify any key trends and issues and have visibility as to where they fit within the network.

Both KPI generation and protocol transaction tracing processes, which are based on building data records upfront for every flow, may have several disadvantages. For KPI generation, while a lot of the data within each record is used, there may be a huge number of KPIs that scales alongside the vast number of flow records but at a faster rate; for every flow record, there are N number of KPIs. All traffic may be treated equally. For example, it may be stored and treated in the same fashion, making identifying useful insight difficult as well as storage intensive. For protocol transaction tracing, since <0.1 percent of calls and sessions are ever traced, correlating every call or session upfront may equate to a lot of wasted processing and storage If network information is continually stored and managed at an individual flow level, a compounding issue may begin to occur. Capturing this information may take time, as does creating the associated flow records and XDRs. Sorting records may also be very time and process intensive, and finally, when it is necessary to retrieve the information, the search time may literally add up to hours. This scalability issue compounds as the network grows. Thus, to keep up with expanding data, it may also be necessary to add hardware and processing power to store and manage the growing database. The problem is that as providers add monitoring capability, the traffic continues to grow, requiring even more monitoring equipment and more cost.

Embodiments described herein may enable a high-level monitoring strategy that provides visibility into most, if not all, of the network and incorporates a model that may allow network providers turn a high-level picture into a more granular one, as needed or as specified. The information gathered and presented may then be refined or abstracted in the areas of interest.

A great analytics solution begins with effective and simple data capturing. In turn, data capture is made possible by an efficient monitoring approach. Embodiments described herein may provide flexible monitoring solutions for continuously expanding networks. From network probes to data collection agents and virtual probes, embodiments described herein may provide simple integration of data sources into a single platform with many viewing and management options. Thus, a cloud-based portal that provides an intuitive, logical, flexible and fast workflow for problem analysis and problem root cause analysis may be provided in a way where users may create their own customizable views by choosing from a broad set of dimensions in order to extract valuable insights for improved CEA.

Embodiments described herein may be embodied as systems, methods, and/or computer program products, e.g., in hardware and/or in software (including firmware, resident software, micro-code, etc.), or computer program product that comprises a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Some embodiments may provide a thorough and accurate analysis of LTE network traffic and service performance in real time while accounting for the explosion in LTE traffic. Although embodiments describe LTE, other various communication protocols may be used. For instance, embodiments described herein may be applied to any communication between the various service providers and/or subscribers may be achieved via transmission of electric, electromagnetic, or wireless signals and/or packets that carry digital data streams using a standard telecommunications protocol and/or a standard networking protocol. These may include Session Initiation Protocol (SIP), Voice Over IP (VOIP) protocols, Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Time Division Multiple Access (TDMA) based systems, Universal Mobile Telecommunications Systems (UMTS), Transmission Control Protocol/Internet (TCP/IP) Protocols, 2G/3G/LTE, video, etc. Other protocols and/or systems that are suitable for transmitting and/or receiving data via packets/signals may also be provided. For example, cabled network or telecom connections such as an Ethernet RJ45/Category 5 Ethernet connection, a fiber connection, a traditional phone wireline connection, a cable connection or other wired network connection may also be used. Communication between the network providers and/or subscribers may also use standard wireless protocols including IEEE 802.11a, 802.11b, 802.11g, 802.11n, 802.11ac, etc., or via protocols for a wired connection, such as an IEEE Ethernet 802.3.

Some embodiments stem from a realization that distributing the packet analysis throughout the network using smaller processing units and agents, which may comprise hardware and/or software/hardware embodiments, called micro network access agents at various access points in the service delivery chain may provide probe units that are linearly cost effective and require a fraction of the processing used in conventional traffic monitoring, test, measurement, and analysis approaches.

A micro network access agent may be embodied as a software application running on the processor of a network element in the LTE network or as a small hardware unit with 1/10/100G Ethernet ports that tap into the current traffic ports and capture the packets in real time. The agent software resides in this case on the processing unit of the hardware and uses a generally small footprint both in processing power and memory.

Because the amount of packet traffic processed at a single network element is generally small compared to aggregate nodes traffic volume, the micro network access agent associated with these access nodes may perform full traffic and packet analysis and may allow prediction and tagging of packets that may eventually contribute to the accurate detection of potential issues with LTE service(s) before they actually propagate throughout the network. The micro network access agent may also have a real time communication mechanism using a network management system, which may facilitate sending signals to other micro network access agents associated with other network elements in the LTE (i.e., other aggregation points throughout the network) to alert these agents of the need to analyze specific packets (e.g., tagged packets) originated from a troubled access node and ignore other packets as they have been determined to be compliant and their analysis completed at the access side. This mechanism may reduce the need to have larger processing units at these aggregate nodes and scale linearly as the network expands. In the case of major or chronic issues, all the micro network access agents at the access nodes may initiate a major failure and a network management system may shut down the analysis at the micro network access agents at the various network elements (i.e., aggregate nodes) because it is not needed anymore.

An operator of an LTE network may interact through a service management system coupled to the network management system to access a "virtual" traffic measurement and analysis probe for the LTE network. The probe may be considered a "virtual" probe because the LTE operator is hidden from the underlying details of how the traffic measurement and analysis is performed. That is, the LTE operator is shielded from the details of whether multiple micro network access agents are used at strategic positions in the LTE network or if fewer mega probes are used that collect traffic measurements and perform analysis at high traffic aggregation points. A virtual probe embodied using multiple micro network access agents according to embodiments may provide similar functionality and features as mega probes and the distributed analysis may be more accurate than that provided by mega probes that use traffic sampling. Moreover, the multiple micro network access agents may scale from a software perspective naturally as the traffic grows hence reducing the exponential cost explosion with the current hardware approach.

FIG. 1 depicts a system architecture for providing visualization and analysis of performance data, according to an exemplary embodiment. Referring to FIG. 1, system 100 may include an LTE network 22, a service management system 24, and a network management system 26 that may be used to interface the service management system 24 to the LTE network 22. It will be understood that the LTE network 22 may be embodied in various ways in accordance with various embodiments. As illustrated in FIG. 1, the LTE network 22 may be embodied in accordance with the System Architecture Evolution Network architecture. The LTE network 22 may include eNode B elements 30a and 30b, a Mobility Management Entity (MME) element 32, a Home Subscriber Server (HSS) 34, a Serving Gateway (SGW) 36, and/or a PDN Gateway (PGW) 38 that are communicatively coupled as shown.

The eNodeB elements 30a and 30b may be base station transceivers for providing network access to User Equipment (UE). The MME element 32 may act as a control node for the LTE access network. Responsibilities for the MME element 32 may include, but are not limited to, idle mode UE tracking and paging procedures including retransmissions, bearer activation/deactivation, and choosing the SGW 36 for a UE at the initial attach and at time of intra-LTE handover. The HSS element 34 may be a central database that contains user-related and subscription-related information. The HSS element 34 may provide functionality related to mobility management, call and session establishment support, user authentication, and access authorization. The SGW element 36 may be configured to forward user data packets while also acting as a mobility anchor for the user plan during inter-eNodeB handovers and as the anchor for mobility between LTE and other 3GPP technologies. The PGW element 38 may provide connectivity from the UE to external packet data networks.

As shown in FIG. 1, micro network access agents 40a, 40b, 40c, 40d, and 40e may be associated with the various network elements comprising the LTE network 22. These micro network access agents 40a, 40b, 40c, 40d, and 40e may be embodied as software applications that execute on the processors of the particular network elements that they are associated with, respectively, or may be embodied as separate hardware elements, which may include software running thereon. Each of these micro network access agents 40a, 40b, 40c, 40d, and 40e may be configured to analyze a portion or all of the packet traffic that is processed by the particular network element that it is associated with. According to some embodiments, the analysis may comprise analyzing one or more performance metrics for the network element, one or more portions of the LTE network 22, and/or the entire LTE network 22. The performance metric(s) may comprise, but are not limited to, traffic throughput, traffic capacity, packet loss, packet latency, packet jitter, base station handover efficiency, voice quality, and video quality. The packet traffic analysis may be performed at the respective micro network access agents 40a, 40b, 40c, 40d, and 40e or, in some embodiments, all or portions of the packet traffic analysis may be performed in the network management system.

The service management system 24 and/or network management system 26 may communicate with the micro network access agents 40a, 40b, 40c, 40d, and 40e to collect, for example, performance, configuration, topology, timing, and/or traffic data therefrom. The data collected by the service management system 24 and/or network management system 26 may be stored in repositories for use by other applications. The data may comprise raw measurement data of the traffic on the LTE network 22 and/or analyzed performance data including analyzed performance metric data generated by the micro network access agents 40a, 40b, 40c, 40d, and 40e. The repositories may, in some embodiments, be implemented as relational database management systems (RDBMS) that support the structured query language (SQL). The collected data in a SQL database may be stored to facilitate access of the collected data by other applications. Advantageously, applications may access a SQL database without having to know the proprietary interface of the underlying RDBMS.

Client applications 42 may communicate with the service management system 24 to access reports generated by the service management system 24 based on analyses of the collected data and to manage the services provided by the LTE network 22 (e.g., determine whether the services provided by the network 22 are in conformance with an agreed upon quality of service). Capacity planning applications 44 may communicate with the service management system 24 to assist an administrator in shaping/configuring the topology/shape of the LTE network 22 and/or to distribute traffic carried by the LTE network 22. Billing applications 46 may communicate with the service management system 24 to generate bills based on analyses of the data collected from the LTE network 22. Finally, service-provisioning applications 48 may communicate with the service management system 24 to facilitate the introduction of new services into the LTE network 22.

The service management system 24 and/or data processing system(s) supporting the client applications 42, the capacity planning applications 44, the billing applications 46, and the service provisioning applications 48 may be configured with computational, storage, and control program resources for managing service quality, in accordance with some embodiments. Thus, the service management system 24 and the data processing system(s) supporting the client applications 42, the capacity planning applications 44, the billing applications 46, and the service provisioning applications 48 may each be implemented as a single processor system, a multi-processor system, or even a network of stand-alone computer systems. In addition, the network management system 26 may be implemented as a single processor system, a multi-processor system, or even a network of stand-alone computer systems.

Although FIG. 1 illustrates an exemplary service/network architecture, it will be understood that embodiments described herein may not be limited to such a configuration but intended to encompass any configuration capable of carrying out the operations described herein.

Figure 2:
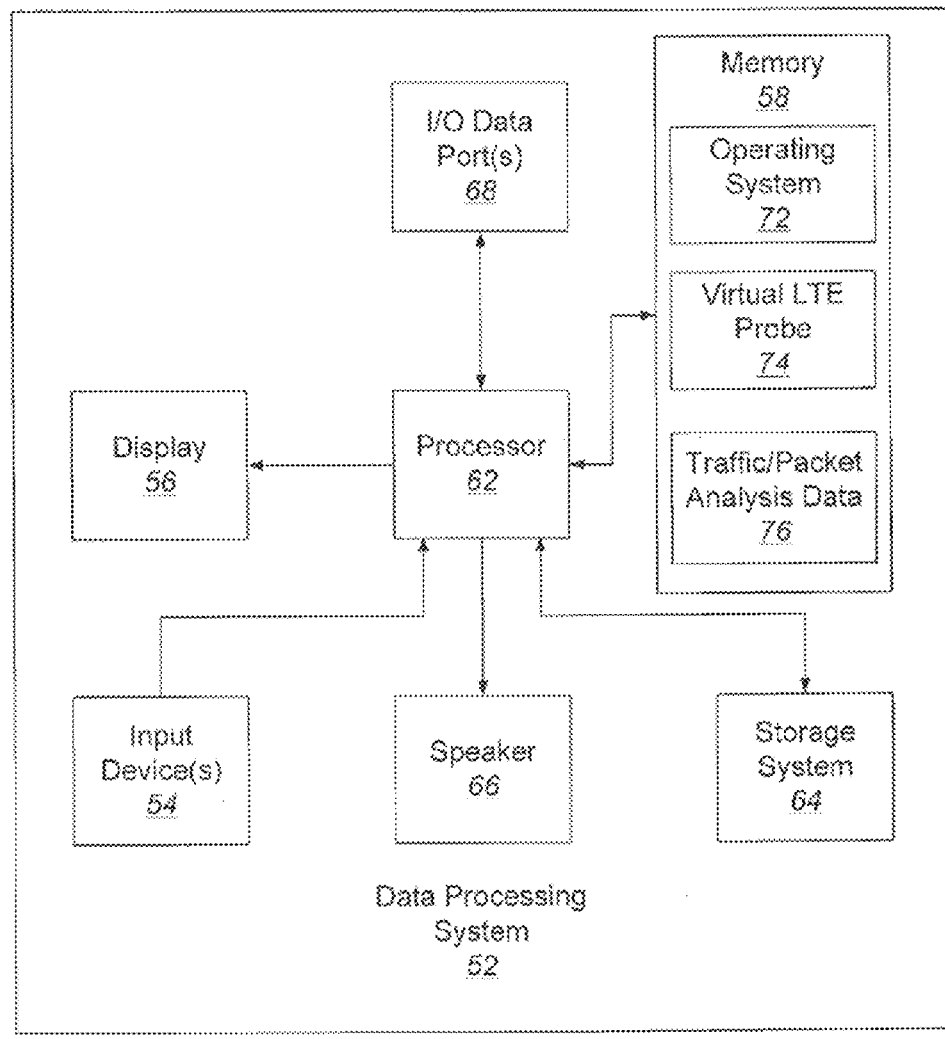
FIG. 2 depicts a module for providing visualization and analysis of performance data, according to an exemplary embodiment.

FIG. 2 depicts a module 200 for providing visualization and analysis of performance data, according to an exemplary embodiment. The description below describes network elements, computers, and/or components of a system and method for optimizing a network and providing improved allocation of network resources using geolocation and handover management that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Referring to FIG. 2, the module 200 may be realized as a network management system 26, which may be embodied as a data processing system 52. Embodiments of the data processing system 52 may include input device(s) 54, such as a keyboard or keypad, a display 56, and a memory 58 that communicate with a processor 62. The data processing system 52 may further include a storage system 64, a speaker 66, and an input/output (I/O) data port(s) 68 that also communicate with the processor 62. The storage system 64 may include removable and/or fixed media, such as floppy disks, ZIP drives, hard disks, or the like, as well as virtual storage, such as a RAMDISK. The I/O data port(s) 68 may be used to transfer information between the data processing system 52 and another computer system or a network (e.g., the Internet). These components may be conventional components such as those used in many conventional computing devices, which may be configured to operate as described herein.

The processor 62 may communicate with the memory 58 via an address/data bus. The processor 62 may be, for example, a commercially available or custom microprocessor. The memory 58 is representative of the overall hierarchy of memory devices containing the software and data used to manage the network in accordance with some embodiments of the present disclosure. The memory 58 may include, but is not limited to, the following types of devices: cache, ROM, PROM, EPROM, EEPROM, flash, SRAM, and DRAM.

As shown in FIG. 2, the memory 58 may hold three or more major categories of software and data: an operating system 72, a virtual LTE probe module 74, and a traffic/packet analysis data module 76. The operating system 72 controls the operation of the network management system 26. In particular, the operating system 72 may manage the network management system's resources and may coordinate execution of programs by the processor 62. The operating system 72 may be configured to allow the software modules in the memory 58 to be implemented as an object-oriented system and may facilitate communication between the various software objects. The virtual LTE probe module 74 may be configured to facilitate access to a client application, such as an application used to facilitate access to the network management system 26 via an operator of the LTE network 22, to allow the application to access and review the packet traffic data and performance metric data generated by the micro network access agents 40*a*, 40*b*, 40*c*, 40*d*, and 40*e* and/or the network management system 26. The traffic packet/analysis data module 76 represents that packet traffic data and performance metric data generated by the micro network access agents 40*a*, 40*b*, 40*c*, 40*d*, and 40*e* and/or the network management system 26.

Computer program code for carrying out operations of the network management system 26 and/or the data processing system 52 discussed above with respect to FIGS. 1 and 2 may be written in a high-level programming language, such as Java, C, and/or C++, for development convenience. In addition, computer program code for carrying out operations of embodiments of the present disclosure may also be written in other programming languages, such as, but not limited to, interpreted languages. Some modules or routines may be written in assembly language or even micro-code to enhance performance and/or memory usage. In some embodiments, the computer program code may include commercially available applications and/or components provided by third parties. It will be further appreciated that the functionality of any or all of the program modules may also be implemented using discrete hardware components, one or more application specific integrated circuits (ASICs), or a programmed digital signal processor or microcontroller.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Although not shown, there may also be included an error logging and reporting module for producing logs, reports, or other information associated with improving service assurance and network management. It should be appreciated that any or all of these components may be communicatively coupled to one or more databases or storage/memory units (not shown), locally or remotely, so that information may be stored for later use or processing.

FIGS. 3A-3G depict illustrative screenshots for providing visualization and analysis of performance data, according to exemplary embodiments.

Figure 3A:
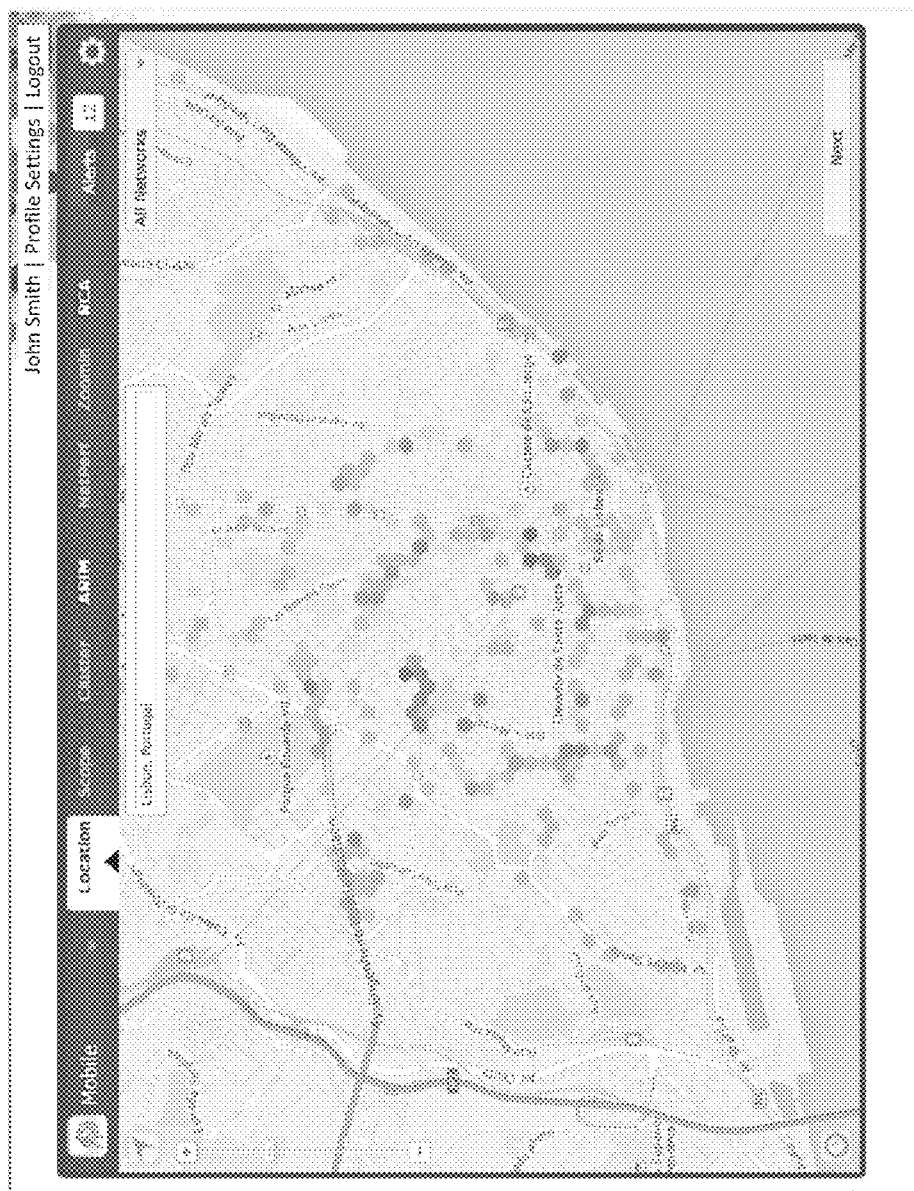

Referring to FIG. 3A, a map view 300A may be presented. Here, any metric or performance indicator that can be associated to a location may be displayed on a map, as specified by a user. A user may interact with the map view and performance host of map-related features, such as zoom in/out, pan, etc. The user may also select the time window of interest, and select an area of interest for which further investigation is desired.

Figure 3B:
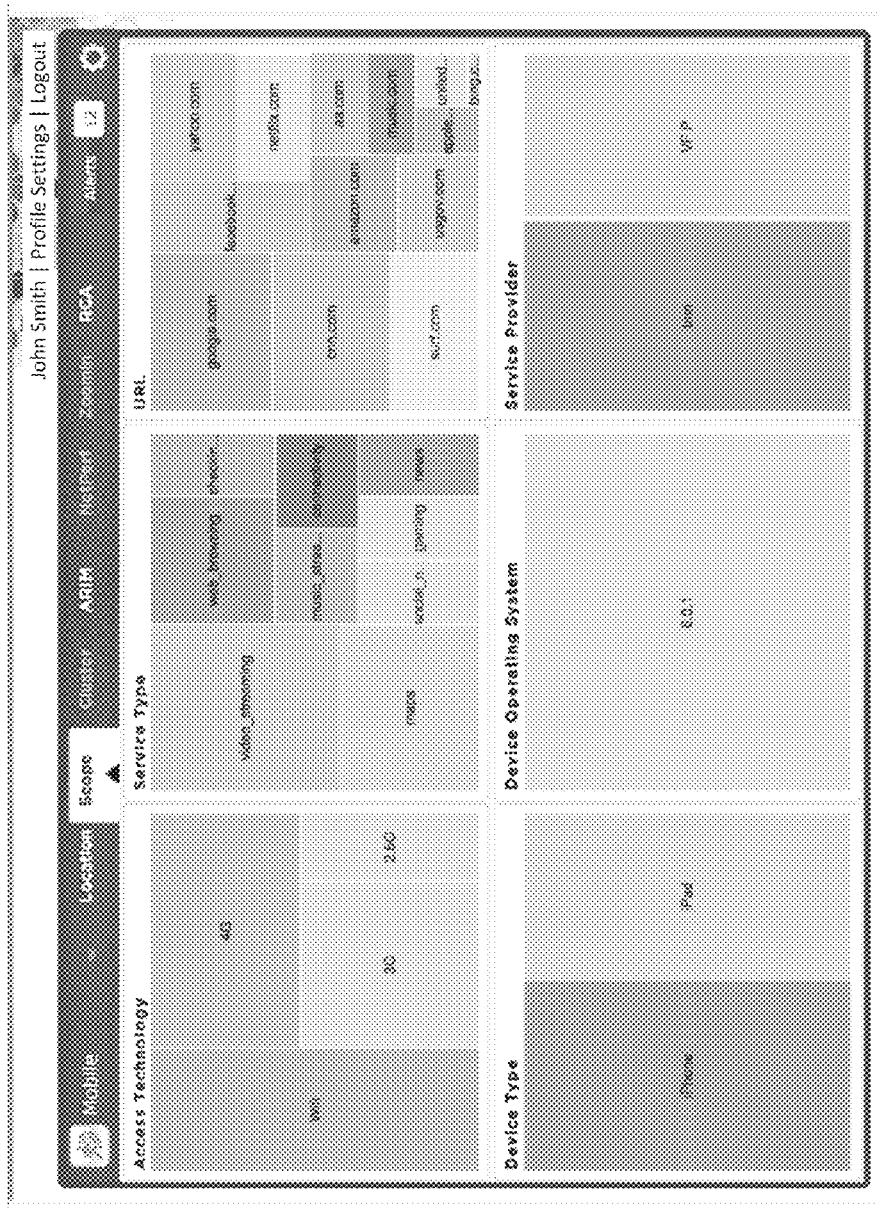

Referring to FIG. 3B, a scope view 300B may be presented. Here, upon selection of an area of interest by the user, for example, the underlying data may be presented from different, configurable, and perspectives to enable the user to uncover correlations between the manifested behavior of the metric or performance indicator on the map and a relevant dimension. Based on this, the user is able to identify, efficiently and effectively, primary domain and aspects responsible for any occurrence or problem within the network.

Figure 3C:
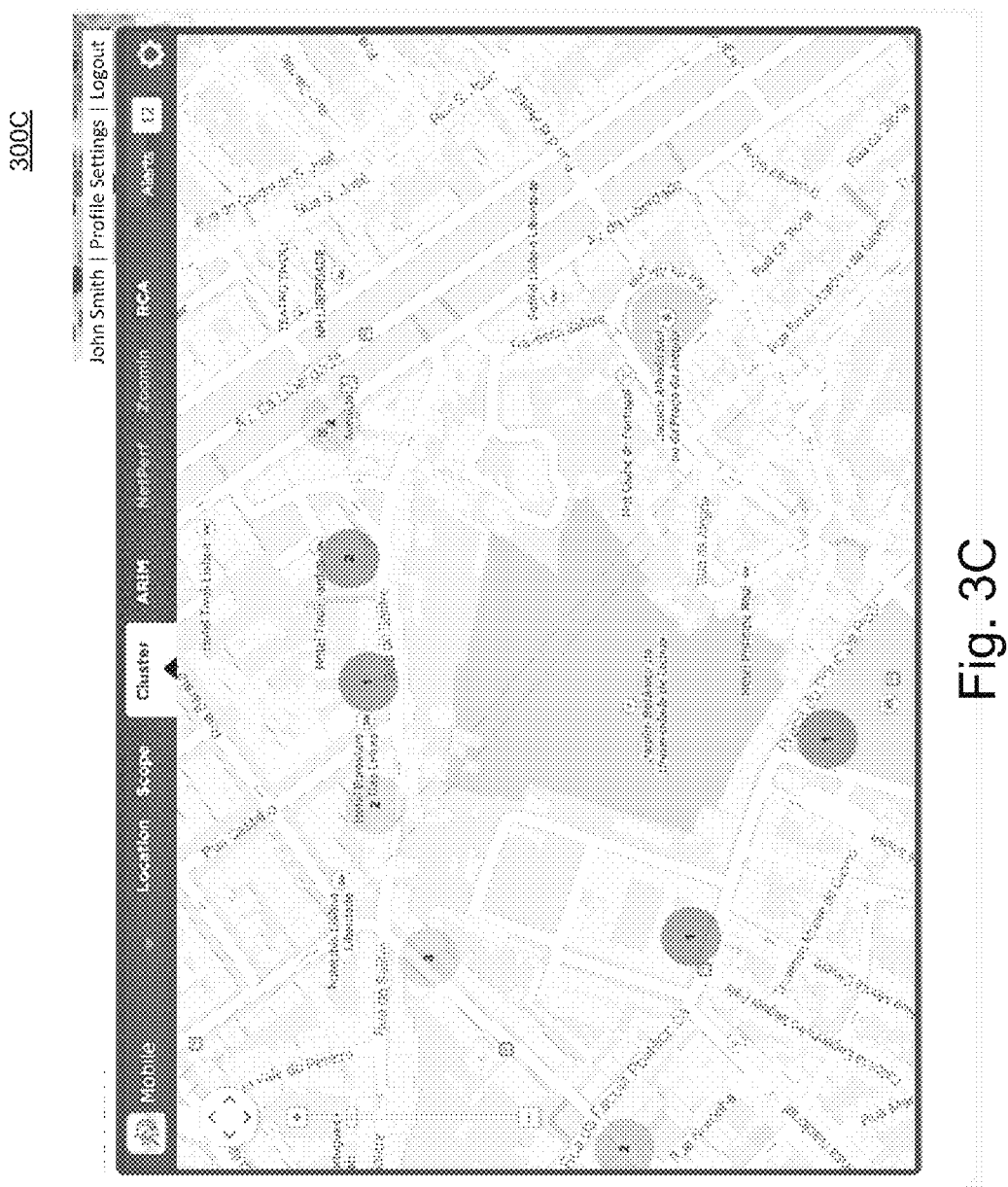

Referring to FIG. 3C, a cluster view 300C may be presented. When further investigation is warranted along one of the dimensions in the scope view 300B, the user may also be able to select any of the values associated to that dimension. At that point, the system may filter the underlying data and may "cluster" the remaining data in order to presents it as such. This cluster view 300C may be helpful as it provides the ability to prioritize investigation tasks based on the extent of the problem being observed or any other meaningful aspect that may be visually displayed and/or interpreted.

Figure 3D:
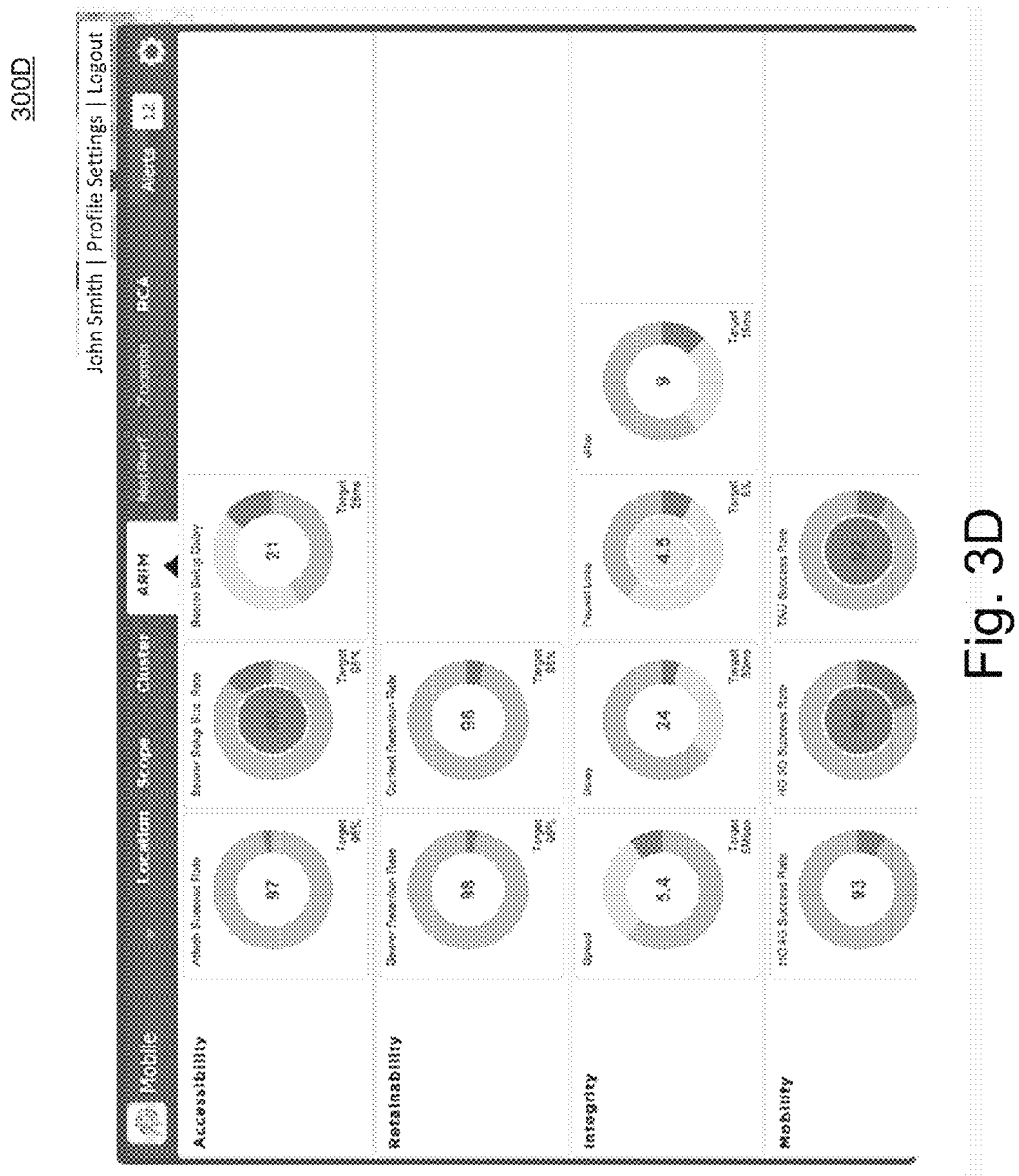

Referring to FIG. 3D, additional metrics and performance view 300D may be presented. Once problems have been prioritized, the system may provide the ability to continue the investigation of a problem by retrieving additional metrics and performance indicators that are related to any selected cluster. These metrics and performance indicators, also referred to as Level 1 metrics, may be displayed in a chart in an ARIM view—accessibility, retainability, integrity, and mobility. This view makes it possible to immediately, easily, and accurately determine any metric or performance indicator whose behavior is most likely correlated to the observed performance behavior. Again, this ARIM view may also allow the user to prioritize his or her next steps, in a way that is in line with the desired strategic scorecard agreed by management. The ARIM chart also represents a very powerful dashboard that may be used to report to upper management or other network performance related functions.

Figure 3E:
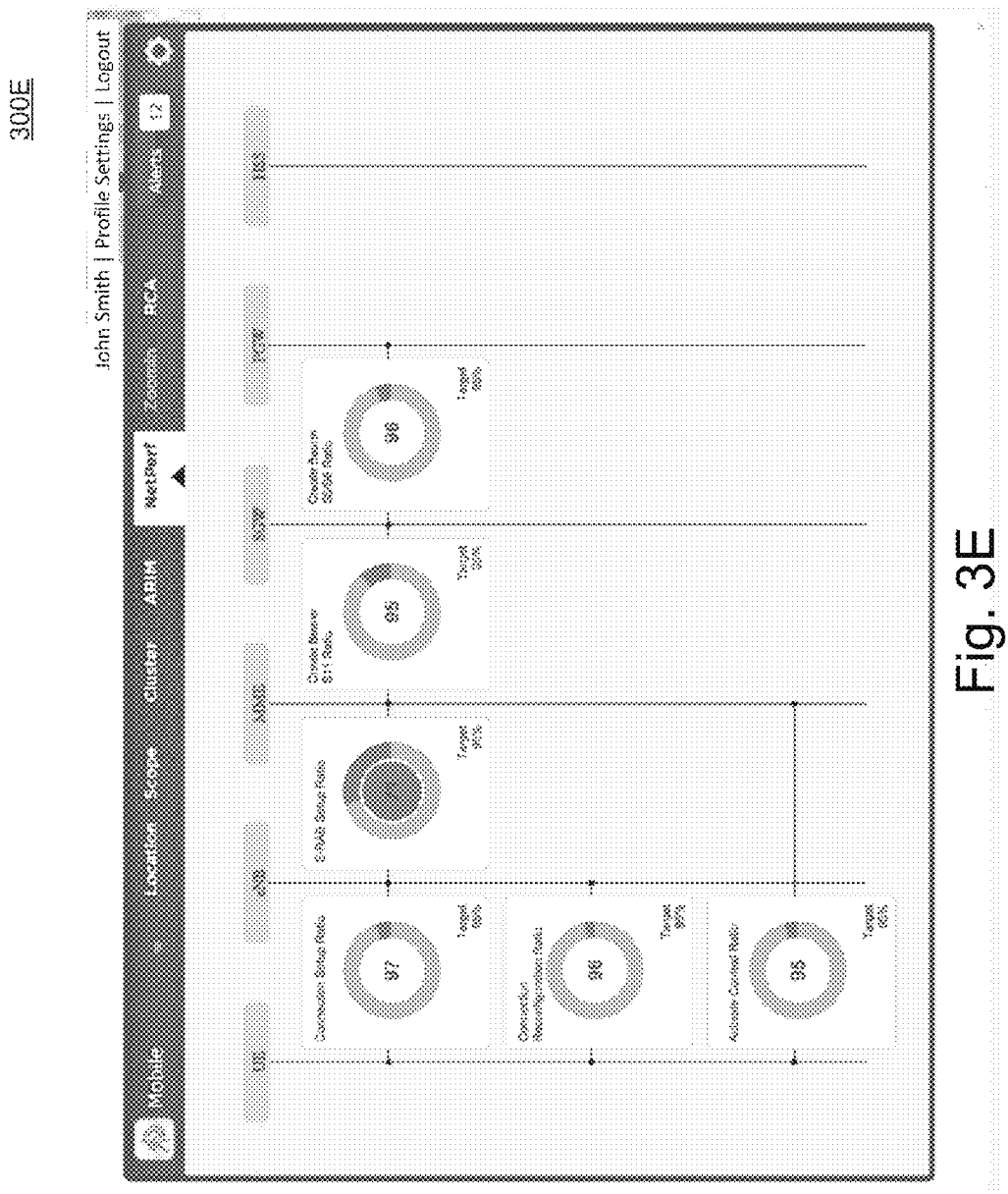

Referring to FIG. 3E, a network performance view 300E may be presented. For the team responsible for investigating the deviation from the expected performance behavior, the system may provide the ability to select a metric or performance indicator of interest on the ARIM chart and start the drill down. When this is done, the system may present a new set of underlying metrics and performance indicators, also referred to as Level 2 metrics and performance indicators, which may be linked to the ARIM metric or performance indicator in the sense that when a level 2 metric or performance indicator fails, the failure may propagate to the ARIM metric or performance indicator in a causal as well as statistically-relevant way. This new representation may provide a network-topological view of the performance in terms of the level 2 metrics or performance indicators and may make it easier to identify where something broke down or is not performing. It should be noted that this view 300E may be easily scalable in the sense that new performance indicators may be easily added without increasing the complexity of the view.

It should be noted that neither the ARIM not the network performance views/chart specify where the metrics and performance indicators should come from. This means that any metric or performance indicator, independently of what data source produces it, may be displayed in the views/charts. What matters is whether or not the metric or performance indicator is inherently correlated, statistically and not, with the problem being investigated at that stage of the workflow.

Figure 3F:
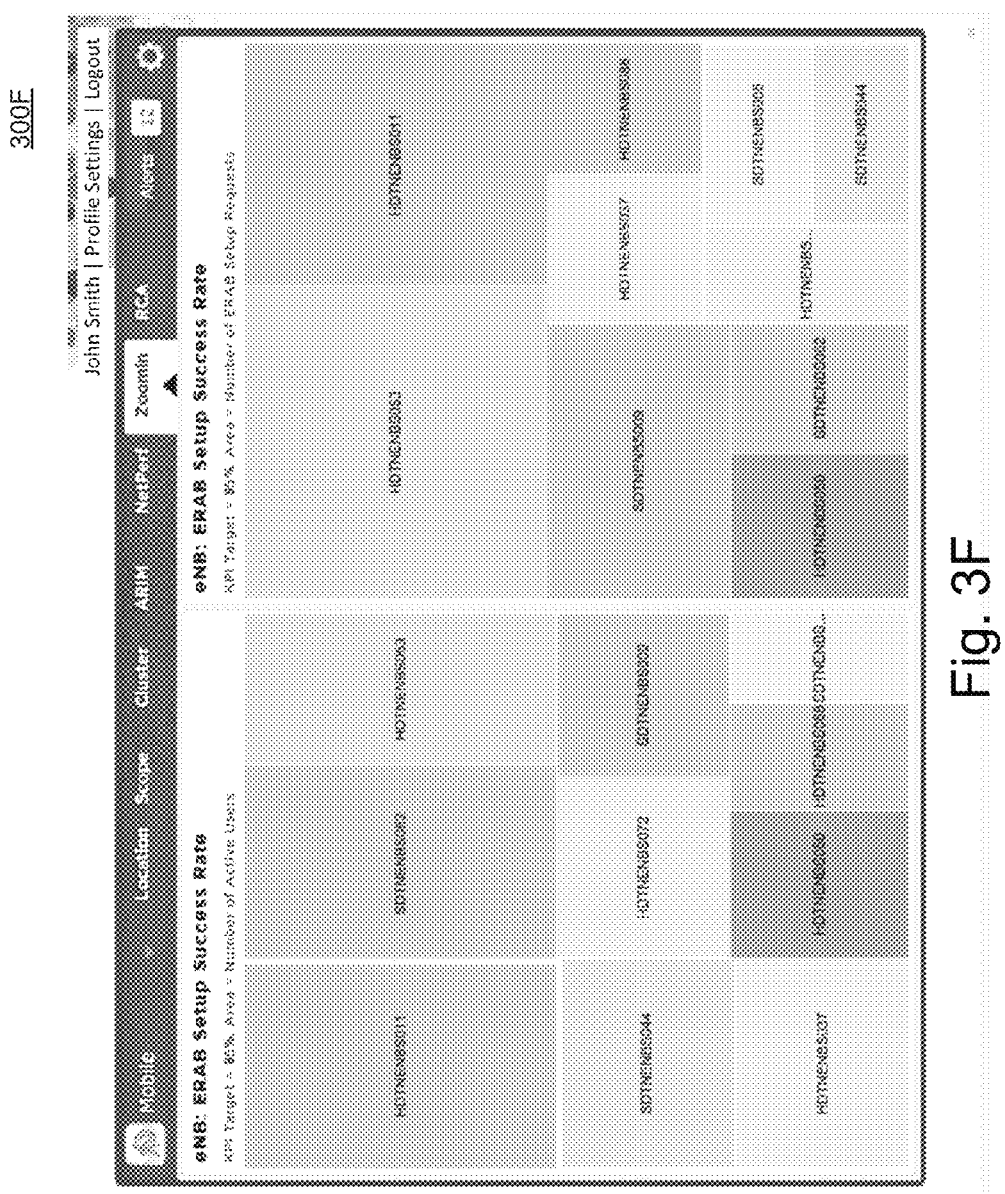

Referring to FIG. 3F, a zoom view 300F may be presented. Once the area(s) likely responsible for the problem has been identified, the system may provide the ability to further drill down to identify the sub-elements in the area(s) and investigate their performance against the metric or performance indicator in question. When this is done, the system may display the zoom view 300F, which may be a visual representation of the performance of each sub-element weighted (e.g., area) in a way such that it visually, immediately, highlights the magnitude of the potential underlying problem. The weighting factors, e.g., the aspects that determine the area associated to each element, may be modified to suit specific needs. From this view 300F, the user may derive quick insights and focus his or her attention on the worst performing areas. Again, this may be a way for the user to prioritize his or her work in the presence of multiple problems that need to be investigated.

Figure 3G:
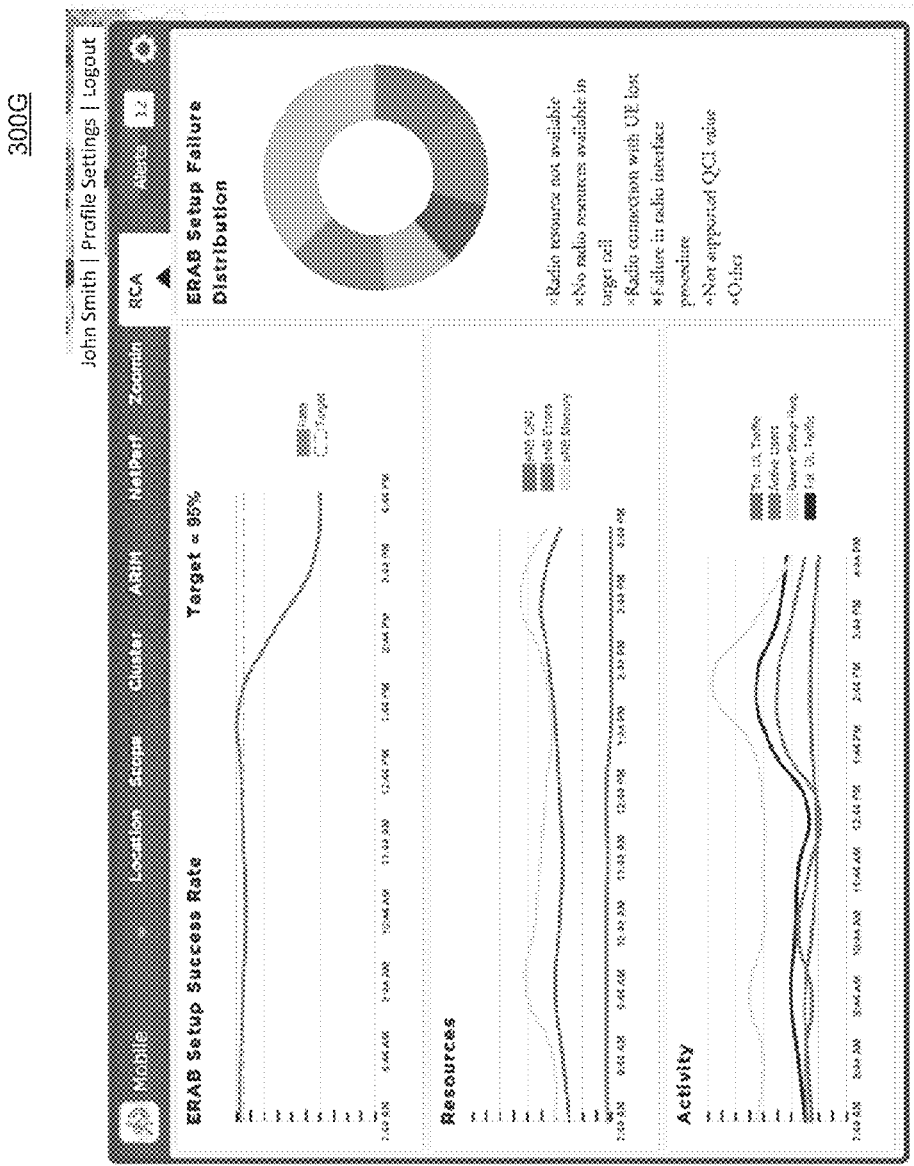

Referring to FIG. 3G, a root cause analysis (RCA) view 300G may be presented. Upon selecting an area for further investigation, the system may provide a summary chart. This view 300G may contain a number of performance metrics and other relevant pieces of information trended over time which, when observed together may provide enough insights to zero in on the major and most probable root causes of the problem. In particular, the view 300G may provide details on the failure causes associated with the failing performance indicator.

Also, the view 300G may provide visibility on a number of activities over time and on the key resources for the area under investigation over time. Both activities and resources may be presented in a way that allows the user to easily detect correlations with the failing performance indicator. The set of activities that is displayed may be the one that is responsible for the behavior of the displayed resources and therefore may be the one most likely to disguise a possible correlation with the resource trend and with the trend of the failing performance indicator itself. As mentioned for other views, also for this view any of the metrics or information displayed may come from any data source and can be easily changed to meet specific user requirements and needs.

Ultimately, information and intelligence presented in this view 300G may be such that the major root causes will be uncovered and characterized. It should be appreciated that the workflow described above may also be accessed by the user at any point, e.g., without having to start from the beginning.

Figure 3H:
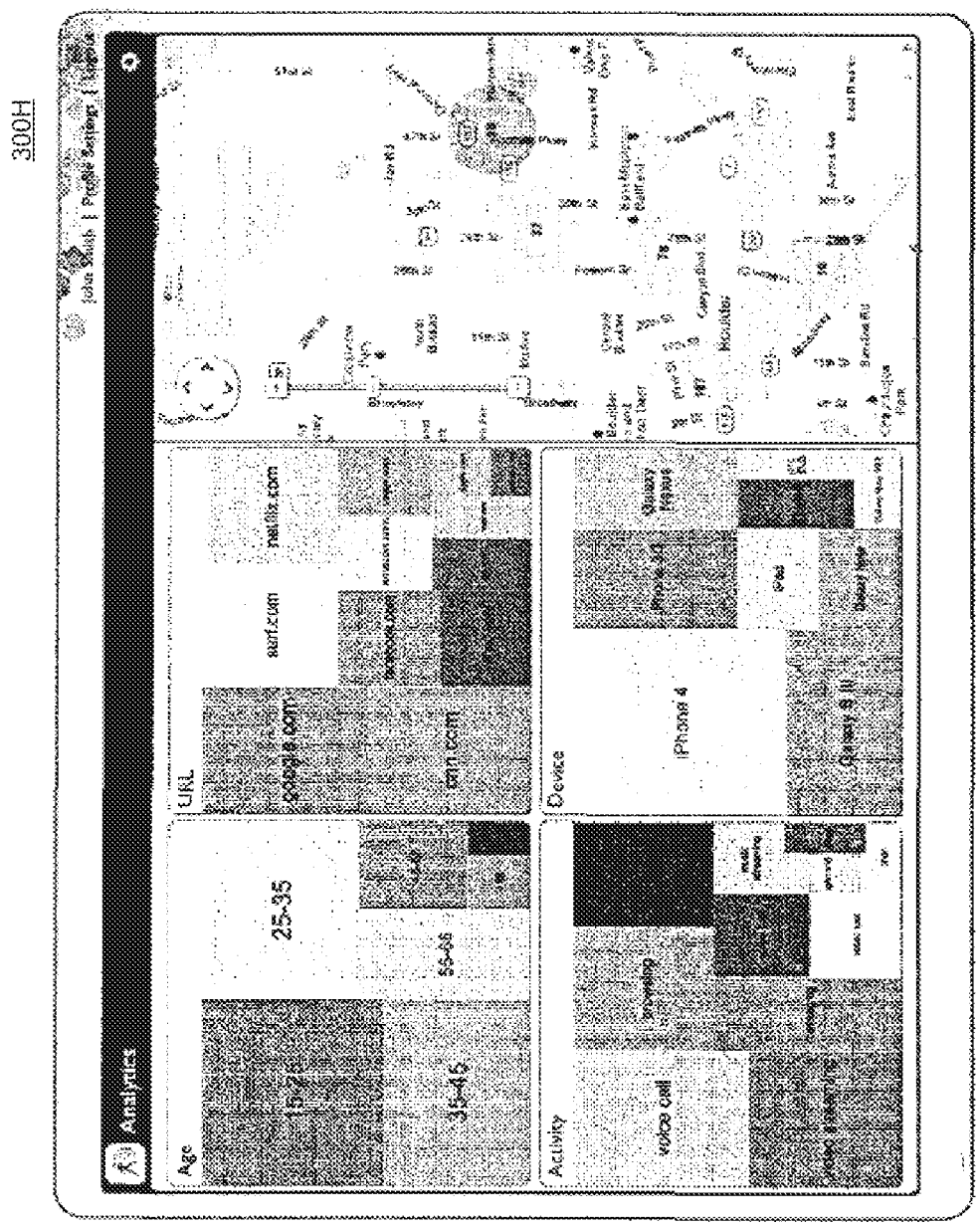
Figure 31:
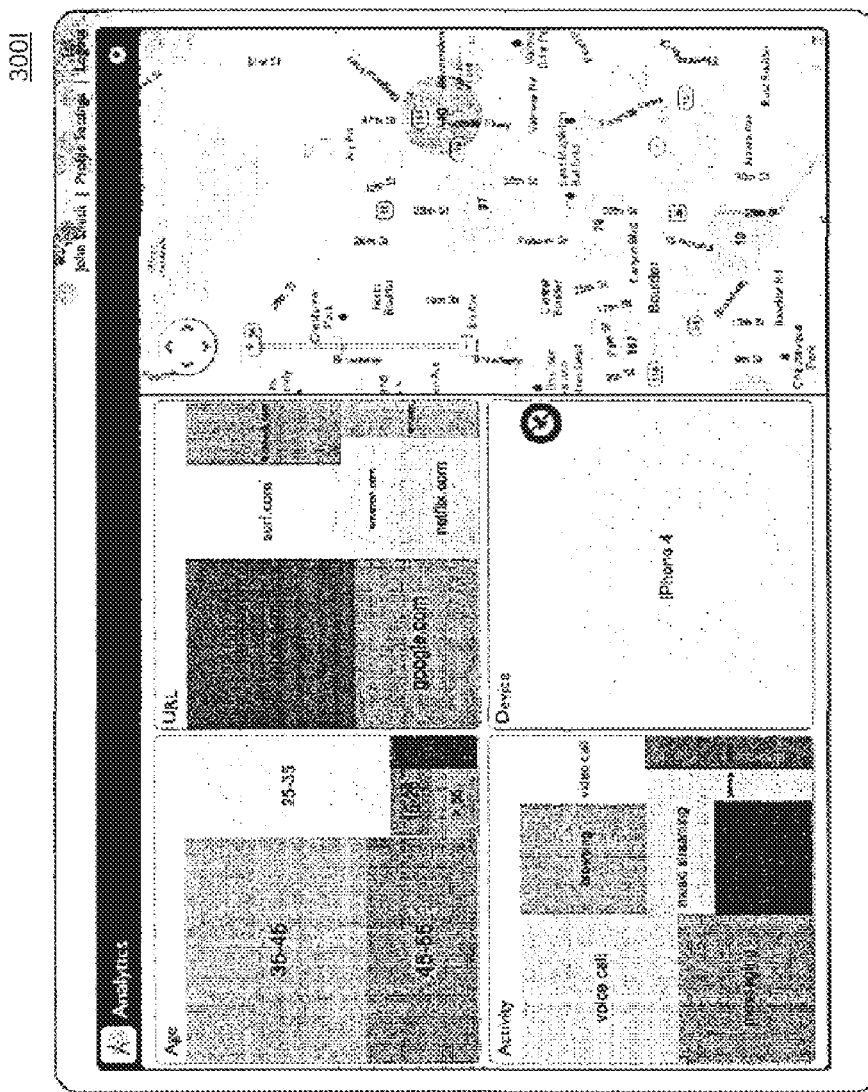

Referring to FIGS. 3H-3I, custom views 300H and 300I may be presented. It should be appreciated that the GUI may enable exploration of data in other logical, intuitive, and flexible ways. For example, a user may be able to extract valuable insights related to aspects or problems being investigate, and may create his or her own customized view by choosing from a broad set of dimensions. When a dimension is selected, by selecting one of its values, that dimension locks and the remaining dimensions, including the map, may be updated to reflect the selected subset of data. The same may happen when one of the clusters on the map is selected. Other various customizations, visualizations, and variations may also be provided.

Figure 4:
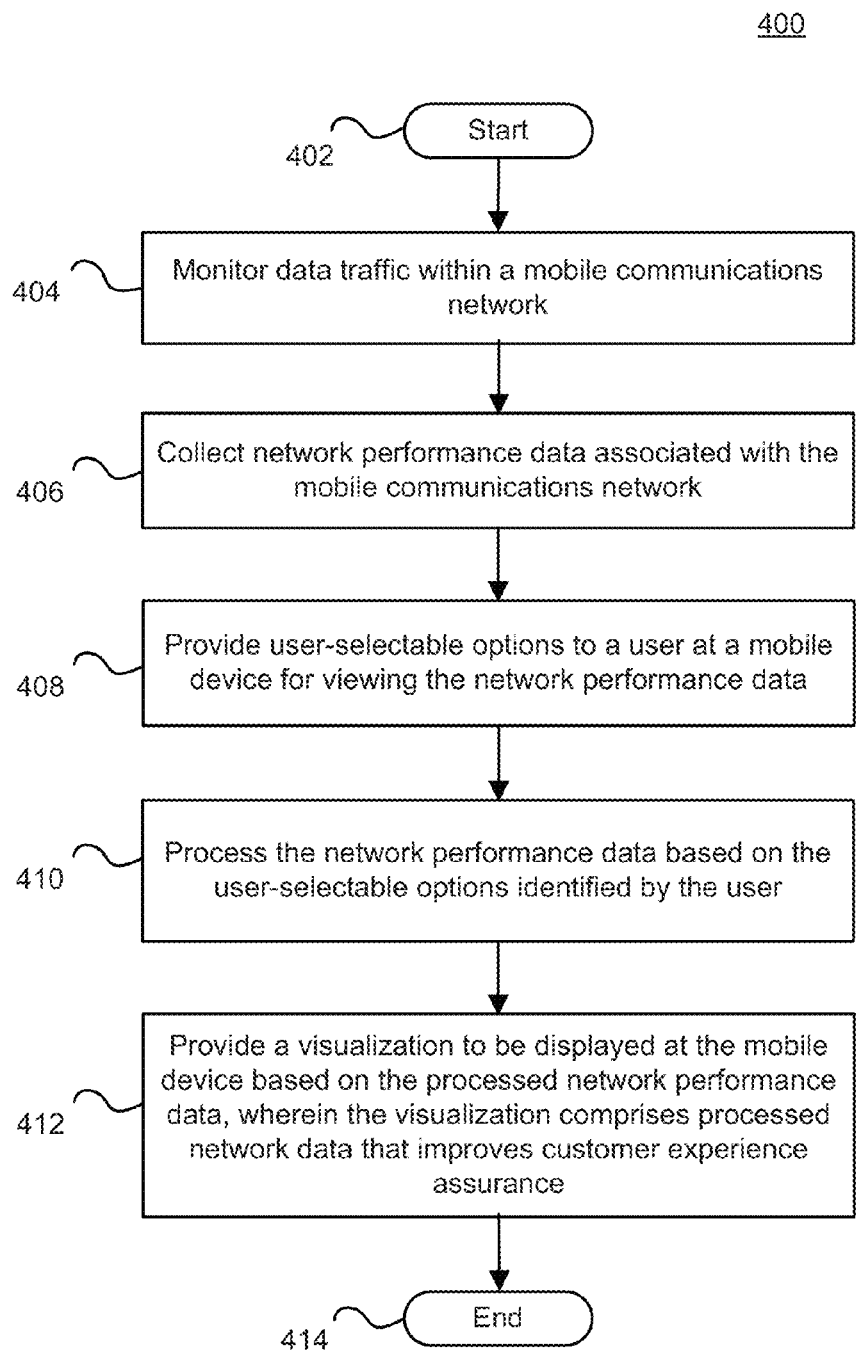
FIG. 4 depicts a flowchart of a method for providing visualization and analysis of performance data, according to an exemplary embodiment.

FIG. 4 depicts a flowchart of a method for providing visualization and analysis of performance data, according to an exemplary embodiment. The exemplary method 400 is provided by way of example, as there are a variety of ways to carry out methods disclosed herein. The method 400 shown in FIG. 4 may be executed or otherwise performed by one or a combination of various systems. The method 400 is described below as carried out by at least architecture 100 in FIG. 1, system 200 in FIG. 2, and integrated with views 300A-300I in FIGS. 3A-3I, by way of example, and various elements of system 100 may be referenced in explaining the exemplary method of FIG. 4. Each block shown in FIG. 4 represents one or more processes, methods, or subroutines carried in the exemplary method 400. A non-transitory computer-readable medium comprising code, which when performed by a computer may perform the acts of the method 400 may also be provided. Referring to FIG. 4, the exemplary method 400 may begin at block 402.

At block 404, data traffic within the mobile communications network may be monitored. The mobile communications network may be an LTE communications network or other network.

At block 406, network performance data associated with the mobile communications network may be collected.

At block 408, user-selectable options may be provided to a user at a mobile device for viewing the network performance data. The user-selectable options may comprise location, date, time, area of interest, performance metric, size, impact, or a variety of other parameters. These parameters may help a user more efficiently retrieve and view network performance data.

The mobile device may comprise at least one of a desktop computer, a laptop or notebook computer, a tablet computer, a wireless phone, a personal digital assistant (PDA), a multimedia device, a video player, a watch or clock, a gaming device, a navigation device, a television, a printer, an automobile, a fitness device, and a medical device.

At block 410, the network performance data may be processed based on the user-selectable options identified by the user. At block 412, a visualization to be displayed may be provided at the mobile device based on the processed network performance data. The visualization comprises at least one of a map view, a scope view, a zoom view, a cluster view, an ARIM view, a network performance view, and a RCA view, or a custom view, as described above. The visualization may present the processed network performance data for improved customer experience assurance.

At block 414, the method 400 may end.

As described herein, providing a portal and analytics applications may help to provide a more effective approach to customer experience assurance (CEA). As mobile users continue to migrate to faster 4G/LTE networks and consume more data from a variety of applications and mobile devices, network complexity and traffic is increasing, making it more complicated for mobile operators to maintain a high level of service quality and to satisfy rapidly changing network, service and customer requirements. At the same time, consumer expectations for a high quality and seamless network experience for mobile voice, data and video services also continues to rise. Using customized information retrieval and visualizations, mobile operators may more proactively identify and resolve problems having the greatest impact on their mobile users. Some important advantages of embodiments are as follows:

Customer Experience—Mobile operators may proactively identify and resolve customer impacting issues in four easy steps and in a fraction of the time compared to traditional assurance solutions.

Real-Time Insight—While traditional assurance systems take 10-15 minutes to access and analyze data, embodiments described herein may process data and present metrics in seconds.

Deep Visibility and Data Monetization—Flexible and open platform may collect and correlate data from any source and delivers real-time, relevant and location-aware intelligence to any application, for deep network visibility. Fast and multi-faceted access to specific data may also improve mobile operators' ability to proactively identify issues and opportunities and create new revenue-generating services.

Improved Cost and Scalability—New value-based approach to data collection, storage and analysis lets operators control cost with traffic growth compared to traditional solutions that treat all traffic equal and cannot scale with traffic in a financially viable fashion.

As a result, embodiments described herein may provide a portal of integrated assurance and diagnostic applications when combined with an open real-time intelligence platform allows operators of 4G/LTE networks access and analyze value-based data from a wide variety of sources across the entire network.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

At this point it should be noted that providing visualization and analysis of performance data in accordance with the present disclosure as described above typically involves the processing of input data and the generation of output data to some extent. This input data processing and output data generation may be implemented in hardware or software. For example, specific electronic components may be employed in a network management module or similar or related circuitry for implementing the functions associated with providing improved visualization and analysis of performance data in accordance with the present disclosure as described above. Alternatively, one or more processors operating in accordance with instructions may implement the functions associated with identifying potential malware domain names in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A system for providing visualization and analysis of performance data, comprising:
one or more processors communicatively coupled to a mobile communications network, wherein the one or more processors are configured to:
collect network performance data associated with the mobile communications network by using micro network access agents,
wherein a first micro network access agent, of the micro network access agents, uses a real time communication mechanism to alert a second micro network access agent, of the micro network access agents, regarding a need to analyze or ignore one or more tagged packets;
provide user-selectable options to a user at a mobile device for viewing the network performance data;
process the network performance data based on the user-selectable options identified by the user to obtain one or more performance indicators; and
provide a sequence of visualizations to be displayed at the mobile device based on the processed network performance data, wherein the sequence of visualizations presents the one or more performance indicators to the user for conducting customer experience assurance.

2. The system of claim 1, wherein the mobile communications network is an LTE communications network.

3. The system of claim 1, wherein the user-selectable options comprise at least one of location, date, time, area of interest, performance metric, size, and impact.

4. The system of claim 1, wherein the mobile device comprises at least one of a desktop computer, a laptop or notebook computer, a tablet computer, a wireless phone, a personal digital assistant (PDA), a multimedia device, a video player, a watch or clock, a gaming device, a navigation device, a television, a printer, an automobile, a fitness device, and a medical device.

5. The system of claim 1, wherein the sequence of visualizations further comprises at least one of a zoom view, a network performance view, and a RCA view, or a custom view.

6. The system of claim 1, wherein providing the visualization comprises providing more filtered information associated with the network performance data.

7. The system of claim 1, wherein the first micro network access agent comprises at least one of:
a software application running on a network element of the mobile communications network, or
a hardware unit having Ethernet ports to capture packets in real time.

8. A method for providing visualization and analysis of performance data, comprising:
collecting network performance data associated with a mobile communications network by using micro network access agents,
wherein a first micro network access agent, of the micro network access agents, uses a real time communication mechanism to alert a second micro network access agent, of the micro network access agents, regarding a need to analyze or ignore one or more tagged packets;
providing user-selectable options to a user at a mobile device for viewing the network performance data;
processing the network performance data based on the user-selectable options identified by the user to obtain one or more performance indicators; and
providing a sequence of visualizations to be displayed at the mobile device based on the processed network performance data, wherein the sequence of visualizations presents the one or more performance indicators to the user for conducting customer experience assurance.

9. The method of claim 8, wherein the mobile communications network is an LTE communications network.

10. The method of claim 8, wherein the user-selectable options comprise at least one of location, date, time, area of interest, performance metric, size, and impact.

11. The method of claim 8, wherein the mobile device comprises at least one of a desktop computer, a laptop or notebook computer, a tablet computer, a wireless phone, a personal digital assistant (PDA), a multimedia device, a video player, a watch or clock, a gaming device, a navigation device, a television, a printer, an automobile, a fitness device, and a medical device.

12. The method of claim 8, wherein the sequence of visualizations further comprises at least one of a zoom view, a network performance view, and a RCA view, or a custom view.

13. The method of claim 8, wherein providing the visualization comprises providing more filtered information associated with the network performance data.

14. The method of claim 8, wherein the first micro network access agent comprises at least one of:
a software application running on a network element of the mobile communications network, or
a hardware unit having Ethernet ports to capture packets in real time.

15. A non-transitory computer-readable storage medium storing a computer program of instructions configured to be readable by at least one computer processor for instructing the at least one computer processor to execute a computer process for:
collecting network performance data associated with a mobile communications network by using micro network access agents,
wherein a first micro network access agent, of the micro network access agents, uses a real time communication mechanism to alert a second micro network access agent, of the micro network access agents, regarding a need to analyze or ignore one or more tagged packets;

providing user-selectable options to a user at a mobile device for viewing the network performance data;

processing the network performance data based on the user-selectable options identified by the user to obtain one or more performance indicators; and providing a sequence of visualizations to be displayed at the mobile device based on the processed network performance data, wherein the sequence of visualizations presents the one or more performance indicators to the user for conducting customer experience assurance.

16. The non-transitory computer-readable storage medium of claim 15, wherein the mobile communications network is an LTE communications network.

17. The non-transitory computer-readable storage medium of claim 15, wherein the user-selectable options comprise at least one of location, date, time, area of interest, performance metric, size, and impact.

18. The non-transitory computer-readable storage medium of claim 15, wherein the mobile device comprises at least one of a desktop computer, a laptop or notebook computer, a tablet computer, a wireless phone, a personal digital assistant (PDA), a multimedia device, a video player, a watch or clock, a gaming device, a navigation device, a television, a printer, an automobile, a fitness device, and a medical device.

19. The non-transitory computer-readable storage medium of claim 15, wherein the sequence of visualizations further comprises at least one of a zoom view, a network performance view, and a RCA view, or a custom view.

20. The non-transitory computer-readable storage medium of claim 15, wherein providing the sequence of visualizations comprises providing more filtered information associated with the network performance data.

* * * * *